United States Patent [19]
Kusano

[11] Patent Number: 5,173,689
[45] Date of Patent: Dec. 22, 1992

[54] SELF-DISTRIBUTED LOGICAL CHANNEL NODE FAILURE RESTORING SYSTEM

[75] Inventor: Toshihiko Kusano, Tokyo, Japan

[73] Assignee: NEC Corporation, Tokyo, Japan

[21] Appl. No.: 719,943

[22] Filed: Jun. 24, 1991

[30] Foreign Application Priority Data

Jun. 25, 1990 [JP] Japan ............... 2-164055

[51] Int. Cl.⁵ .................. H04B 3/38; G06F 11/00
[52] U.S. Cl. ............................ 340/827; 371/8.2; 371/11.1
[58] Field of Search ........... 340/827, 826, 825.01, 340/825.16; 371/11.1, 11.2, 11.3, 8.2; 370/16, 13

[56] References Cited

PUBLICATIONS

C. Han Yang et al., "Failure Immunization Technology for Network Service Survivability", 1988 IEEE, 1988, pp. 1549-1554.
Hamid R. Amirazizi "Controlling Synchronous Networks with Digital Cross-Connect Systems", 1988 IEEE, 1988, pp. 1560-1563.
W. D. Grover "A Fast Distributed Restoration Technique for Networks Using Digital Crossconnect Machines" 1987 IEEE, 1987, pp. 1090-1095.

Primary Examiner—Donald J. Yusko
Assistant Examiner—R. Gray
Attorney, Agent, or Firm—Foley & Lardner

[57] ABSTRACT

A self-distributed transmission line failure restoring system includes three nodes or more arbitrarily interconnected by bidirectional transmission lines. Each of the nodes includes an alternate route search information transmitting unit, an alternate route connection information transmitting unit, a check information transmitting unit, and a check information receiving unit. The alternate route search information transmitting unit transmits alternate route search information to all of the connected transmission lines. The alternate route connection information transmitting unit forms alternate route connection information having a node trace and transmitting the information to a connection destination node. The check information transmitting unit receives the alternate route connection information to set an alternate route and transmitting check information having a node trace to a connection source node through the set alternate route. The check information receiving unit receives the check information to determine an alternate route of a failed transmission line.

12 Claims, 14 Drawing Sheets

FIG.2

CTRL: | PACKET TYPE | NODE TRACE | HOP COUNT | XMT LINE ID | CONNECTION SOURCE NODE ID | CONNECTION DESTINATION NODE ID |

RTN: | PACKET TYPE | RTN PACKET TRANSMISSION NODE ID | INTRANODE SERIAL NO. | NODE TRACE | XMT LINE ID | CONNECTION SOURCE NODE ID | CONNECTION DESTINATION NODE ID |

END: | PACKET TYPE | RTN PACKET TRANSMISSION NODE ID | SERIAL NO. | NODE TRACE | XMT LINE ID | FAULTY LINE ID |

ACK/NAK: | PACKET TYPE | RTN PACKET TRANSMISSION NODE ID | SERIAL NO. | NODE TRACE | XMT LINE ID |

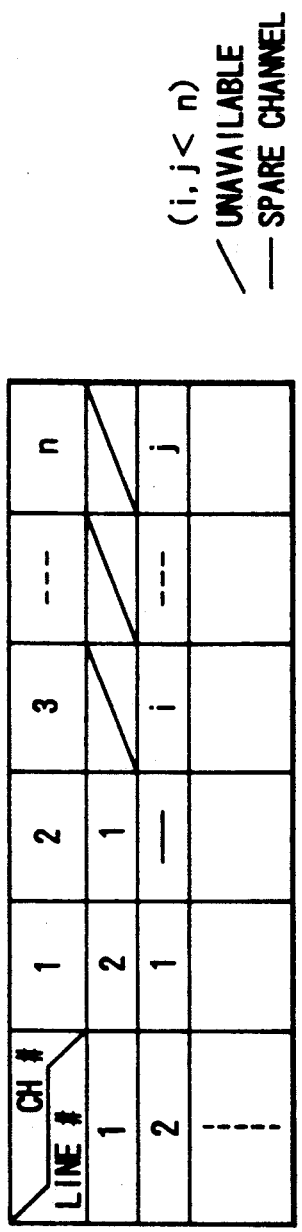
FIG.3A
FIG.3B
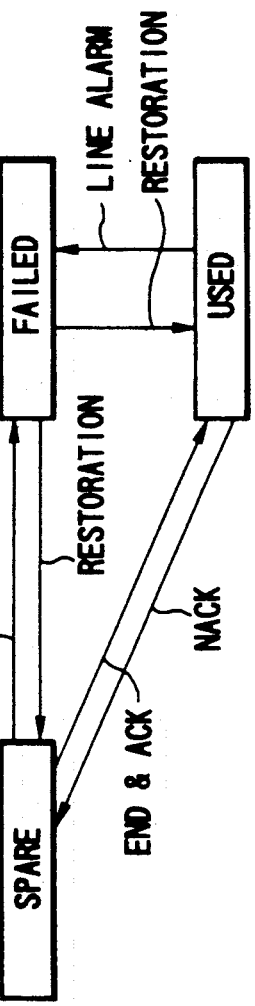
FIG.4

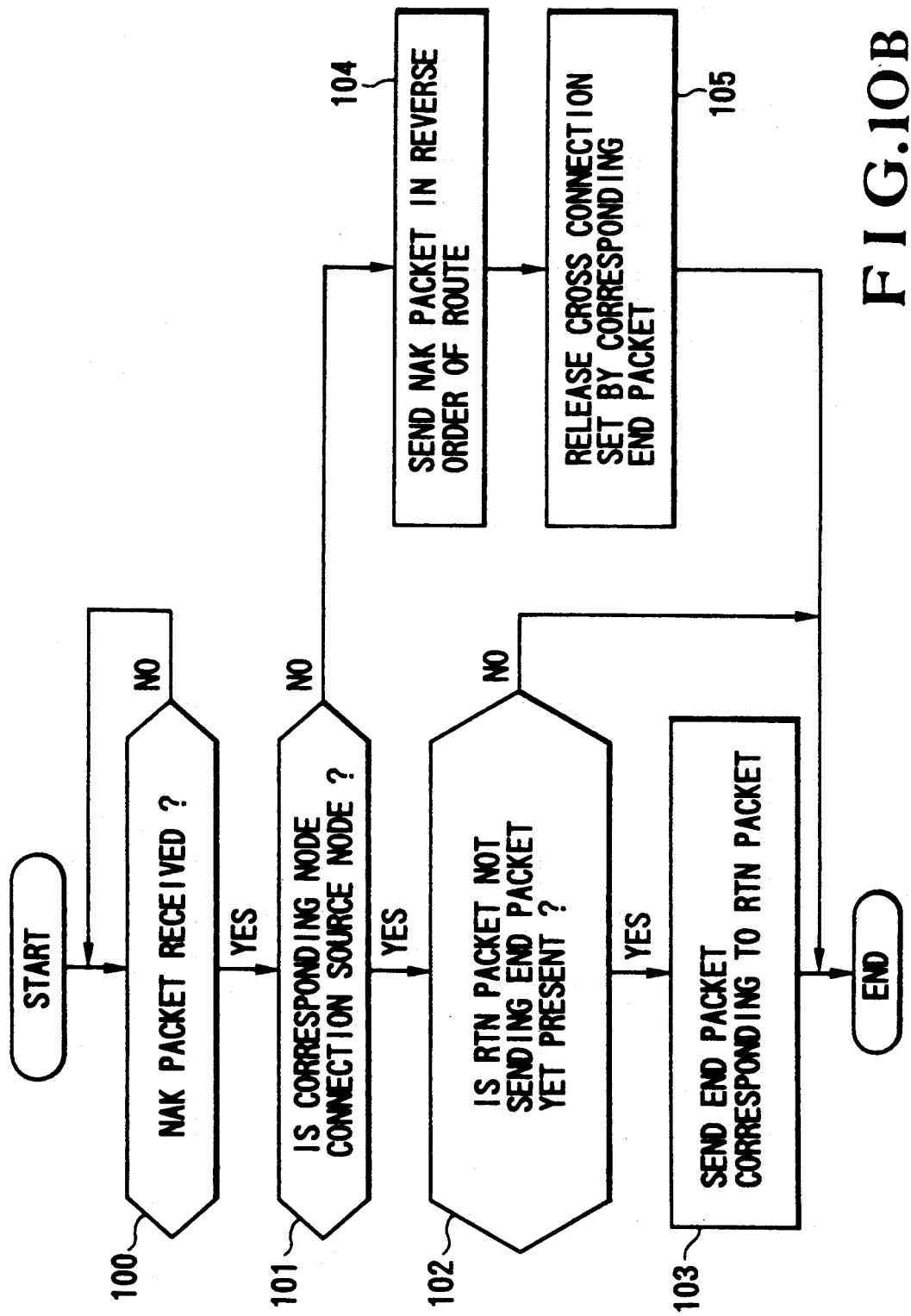

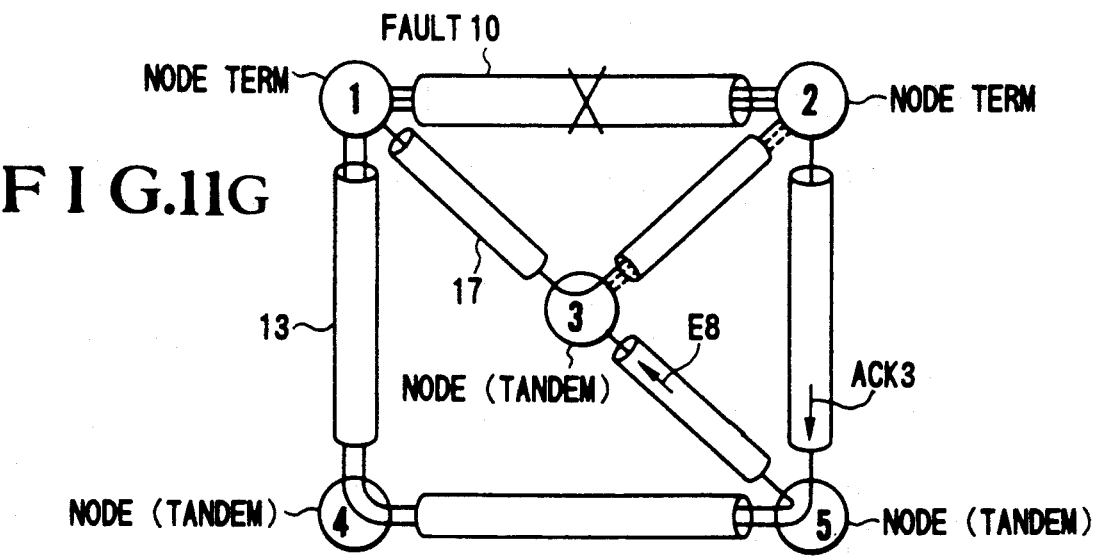
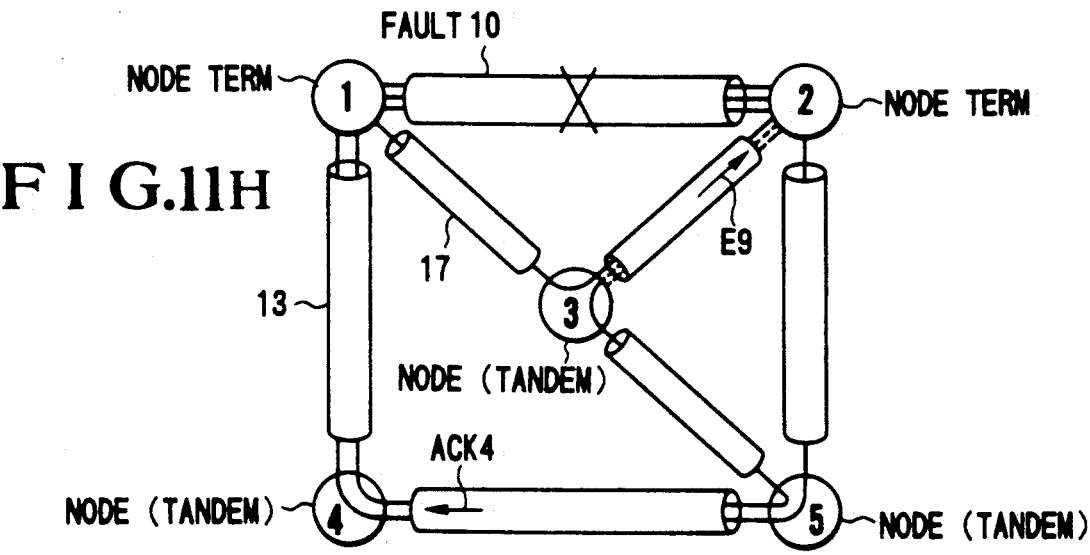
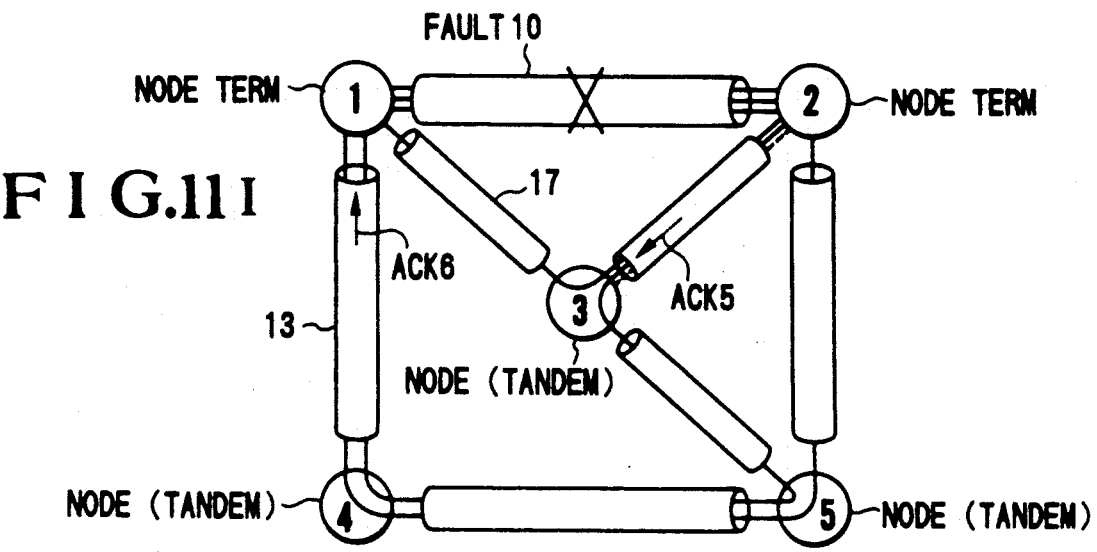

SELF-DISTRIBUTED LOGICAL CHANNEL NODE FAILURE RESTORING SYSTEM

BACKGROUND OF THE INVENTION

The present invention relates to a failure restoring system of a transmission network and, more particularly, to a failure restoring system for forming an alternate route between logical channel nodes by self-distributed processing.

In a logical channel node failure restoring system of a conventional self-distributed network failure restoring system, in response to failure detection on the downstream side of a failure, a unit on the downstream side of the failed channel sends a packet for searching an alternate route to all connected transmission lines. A relay unit adds information such as the No. of its own node and the number of passed hops to the alternate route search packet and similarly sends the alternate route search packet to all the connected transmission lines. When a node on the upstream side of the failure, i.e., a final connection destination receives the alternate route search packet, the node checks in a reception order whether required alternate channel conditions are satisfied. If a corresponding channel is present, the node sends a connection request packet to the channel to perform failure restoration.

In the conventional self-distributed logical channel node failure restoring system, however, the alternate route search packet passed through various paths reaches a corresponding logical node having a channel to be restored. Therefore, since a channel which satisfies predetermined conditions (e.g., the number of hops) is selected as an alternate route, an optimal alternate route is not sometimes selected.

SUMMARY OF THE INVENTION

It is an object of the present invention to provide a self-distributed transmission line failure restoring system capable of setting, when a failure occurs on a transmission line which arbitrarily interconnects three or more nodes, an optimal alternate route for the failed transmission line.

It is another object of the present invention to provide a self-distributed transmission line failure restoring system capable of preventing double setting of alternate routes for a single path in the stage of information formation.

It is still another object of the present invention to provide a self-distributed transmission line failure restoring system which does not require centralized control.

In order to achieve the above objects of the present invention, there is provided a self-distributed transmission line failure restoring system comprising three or more nodes arbitrarily interconnected by bidirectional transmission lines, each of the nodes having an alternate route search information transmitting unit for transmitting alternate route search information to all of the connected transmission lines when a corresponding node is determined to be a channel terminal of a failed transmission line in accordance with failure detection information; an alternate route connection information transmitting unit for forming alternate route connection information having a node trace and transmitting the information to a connection destination node upon receiving the alternate route search information from both channel terminal nodes; a check information transmitting unit for receiving the alternate route connection information to set an alternate route and transmitting check information having a node trace to a connection source node through the set alternate route when a corresponding node is determined to be a connection destination node; and a check information receiving unit for receiving the check information to determine an alternate route of a failed transmission line when a corresponding node is determined to be the connection source node.

BRIEF DESCRIPTION OF THE DRAWINGS

FIG. 2 is a view showing data structures of packets employed in the rerouting operation of the present invention;

FIGS. 3a and 3b are views showing a channel status table and a channel priority table, respectively;

FIG. 4 is a schematic view showing the statuses of user channels and spare channels;

FIG. 10b is a flow chart showing NAK packet receiving processing; and

FIGS. 11a to 11l are schematic views showing another embodiment of the present invention.

DETAILED DESCRIPTION OF THE PREFERRED EMBODIMENTS

Figure 1:
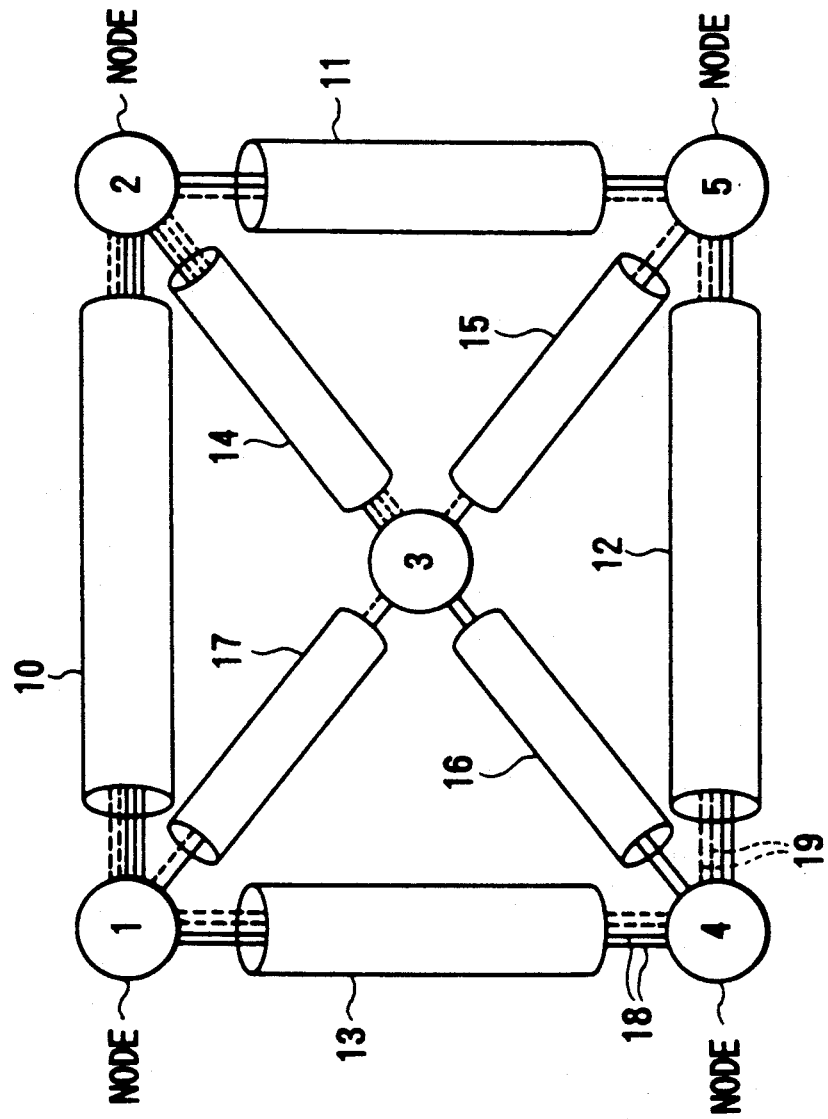
FIG. 1 is a schematic view showing a simplified communications network having distributed restoration capabilities according to the first embodiment of the present invention.

Referring now to FIG. 1, there is shown a simplified communications network having distributed restoration capabilities according to the first embodiment of this invention. The network is made up of several nodes, designated 1 through 5, each having a digital cross-connect system for interconnecting logical channels between neighboring nodes. All nodes are interconnected by transmission lines or cables designated 10 through 17. Each transmission line includes one or more regular or user channels (solid lines) typically shown at 18 and spare channels (broken lines) typically shown at 19 for future use and failure restoration purposes. For example, the transmission line 10 includes three user channels and two spare channels and the line 11 includes two user channels and one spare channel, and so on. Nodes of any pair of the networks are interconnected by one or more user channels with an intermediate node establishing a link between such channels by its cross-connect system.

The types of packets employed in the rerouting operation of the invention are a CONTROL (to be referred to as CTRL hereinafter) packet, a RETURN (to be referred to as RTN hereinafter) packet, an END packet, an ACK (positive acknowledgment) packet and an NAK (negative acknowledgment) packet. The data structures of these packets are shown in FIG. 2. The CTRL packet contains a packet type identifier field, a node trace data field, a hop count field, a transmission (XMT) line identifier field, a connection source node identifier field and a priority field. The node trace data field contains a series of bits each being uniquely assigned to a node to indicate the record of a path which the packet has travelled. When a CTRL packet is passed through a node, a "1" is set to the bit position of the node trace data which is assigned to that node. The hop count field indicates the number of nodes the packet has passed through. Each node increments the hop count field as it passes it on to the next node. This hop count is checked by each node to prevent unnecessary CTRL packets from propagating through the network. The transmit line identifier indicates the transmission line on which the CTRL packet is being transmitted. The transmission line identifier sends the ID of its own node as a connection source node ID and the ID of a failed line destination as a connection destination ID.

One of two nodes between which a line fault has occurred is called a "connection source node" and the other a "connection destination node". Should a cable failure occur, CTRL packets are initially broadcast from the connection source node and the connection destination node to adjacent nodes, and are relayed along the network. On receiving such CTRL packets, the connection destination node checks whether a relief route can be formed, and if possible, sends RTN packets back to the connection source node (i.e., mechanically assigns a node having a small ID in the network to the connection source node), the RTN packets being relayed backward to the connection source node through the route along which corresponding CTRL packets have travelled. The RTN packet contains the ID of a node which sends the RTN packet and a serial number following its packet type field in the node. Each RTN packet is given a serial number by the connection destination node, and this serial number remains unchanged as the packet propagates through the network. Similar to the CTRL packet, the RTN packet also includes fields for node trace data, a transmit line ID, a connection source node ID, and a connection destination node ID.

On receiving an RTN packet, the connection source node switches a failed channel to the spare channel in a connection priority order in the failed line and sends an END packet back to a tandem node. The status of the spare channel is now changed to "used". The END packet is passed along the same route on which the received RTN packet has travelled. The END packet contains a copy of the return-packet serial number and the transmit line identifiers, and the assigned faulty channel identifier.

ACK packets are used to indicate whether a spare channel is already used or not. When a positive ACK packet is received, the status of an incoming spare is changed to "used", and if an NAK packet is received, an attempt is made to search an alternate route and an RTN packet is sent if it is found.

For purposes of routing the packets, each node is provided with a channel status table as shown in FIG. 3a and a channel priority table as shown in FIG. 3b. As shown schematically in FIG. 4, the status of user (regular) channels is usually marked "used"0 in the associated entries of the table and the status of spare channels is indicated "spare" in the associated table entries. Should a cable failure occur in a transmission line, the status of user or spare channels of the line is updated to "failed". The "spare" state will be changed to a "used" state when an END packet is transmitted or an ACK packet is received, or reset to the "spare" state in response to a NAK packet. When a cable failure is restored following a network reconfiguration, the failure indications of the restored user and spare channels will be updated to "spare" and "used", respectively.

Figure 5:
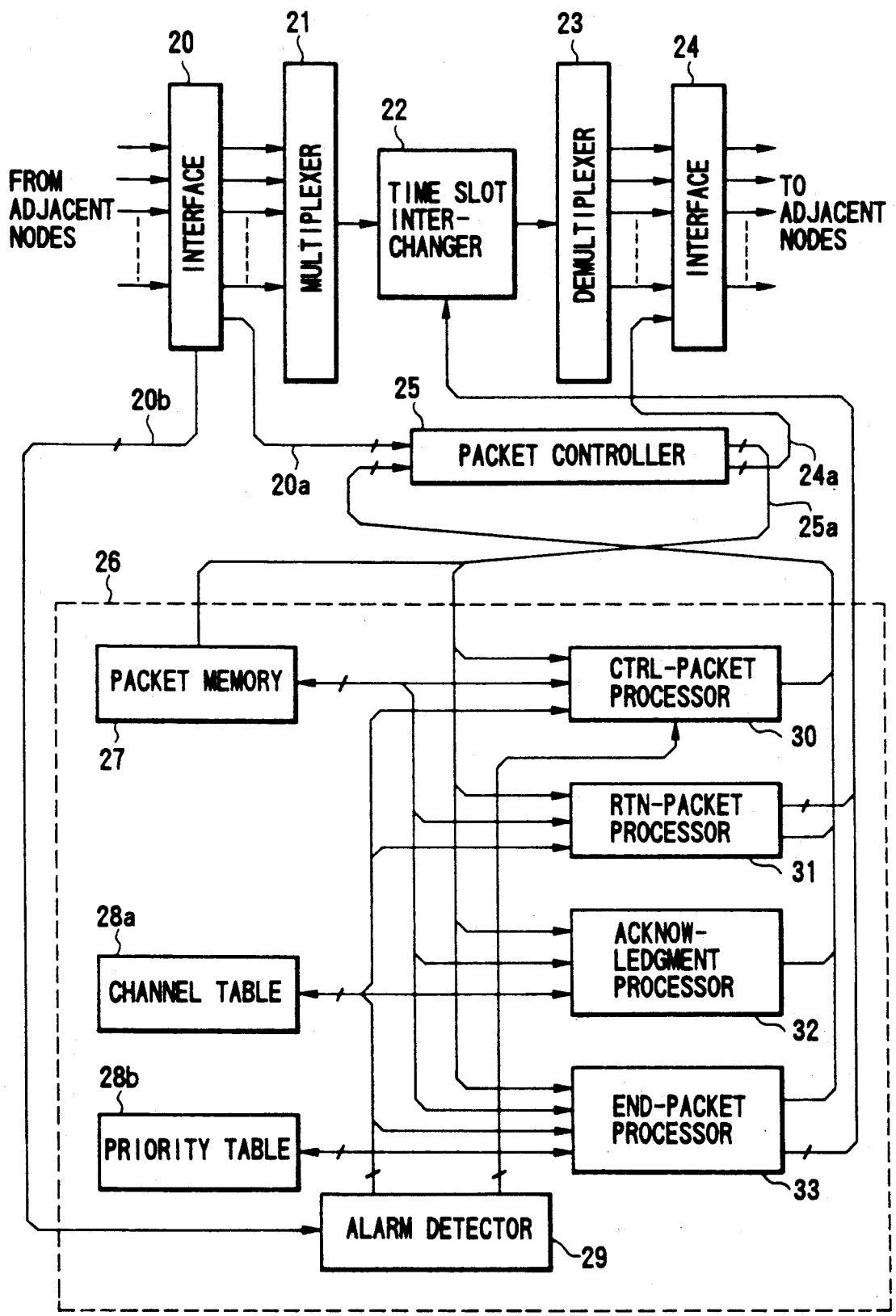
FIG. 5 is a block diagram showing a digital cross-connect system according to the present invention.

As shown in FIG. 5, the digital cross-connect system of each node comprises an interface 20 to which incoming logical channels are terminated. A time-division multiplexer (TDM) 21 is coupled to the interface 20 for multiplexing its outputs into an inlet highway which serves as the input of a time slot interchanger (TSI) 22. In response to a control signal, the TSI 22 switches the time slots of the TDM input to desired time slots of an outlet highway which leads to a time division demultiplexer 23, so that signals on the incoming logical channels may appear at desired outputs of the demultiplexer 23 and are transmitted through an outgoing interface 24 to an adjacent node. Each node further includes a packet controller 25 and a rerouting controller 26. The incoming paths of control channels are provided from the interface 20 to the packet controller 25 through lines 20a and outgoing paths of the control channels lead from the packet controller 25 to the outgoing interface 24 through lines 23a. The rerouting controller 26 includes a packet memory 27 which is connected to the packet controller 25 to receive incoming packets through lines 25a to make a record of packets that have been propagated through different routes of the network. For half- or full-duplex operation, a similar set of DCS (digital cross-connect system) components may be provided.

The packets received by the controller 25 are also applied to a control-packet processor 30, a return-packet processor 31, an acknowledgment (ACK/NAK) processor 32, and an end-packet processor 33. Each of these processors has an access path to the packet memory 27 to check the received packet against those stored in the packet memory 27. The channel status table is shown at 28a to which all processors are accessible to update its contents whenever a packet is sent or received. The priority table 28b is accessed by the end-packet processor 33.

The incoming interface 20 is provided with a failure detection circuitry, not shown, which applies a fault alarm signal through lines 20b to an alarm detector 29 if a failure occurs in the associated transmission line, identifying the failed line and logical channels. In response to the fault alarm, the alarm detector 29 updates the status of the faulty channels to "failed" and enables the control-packet processor 30 to invoke a series of events that follow.

Figure 6:
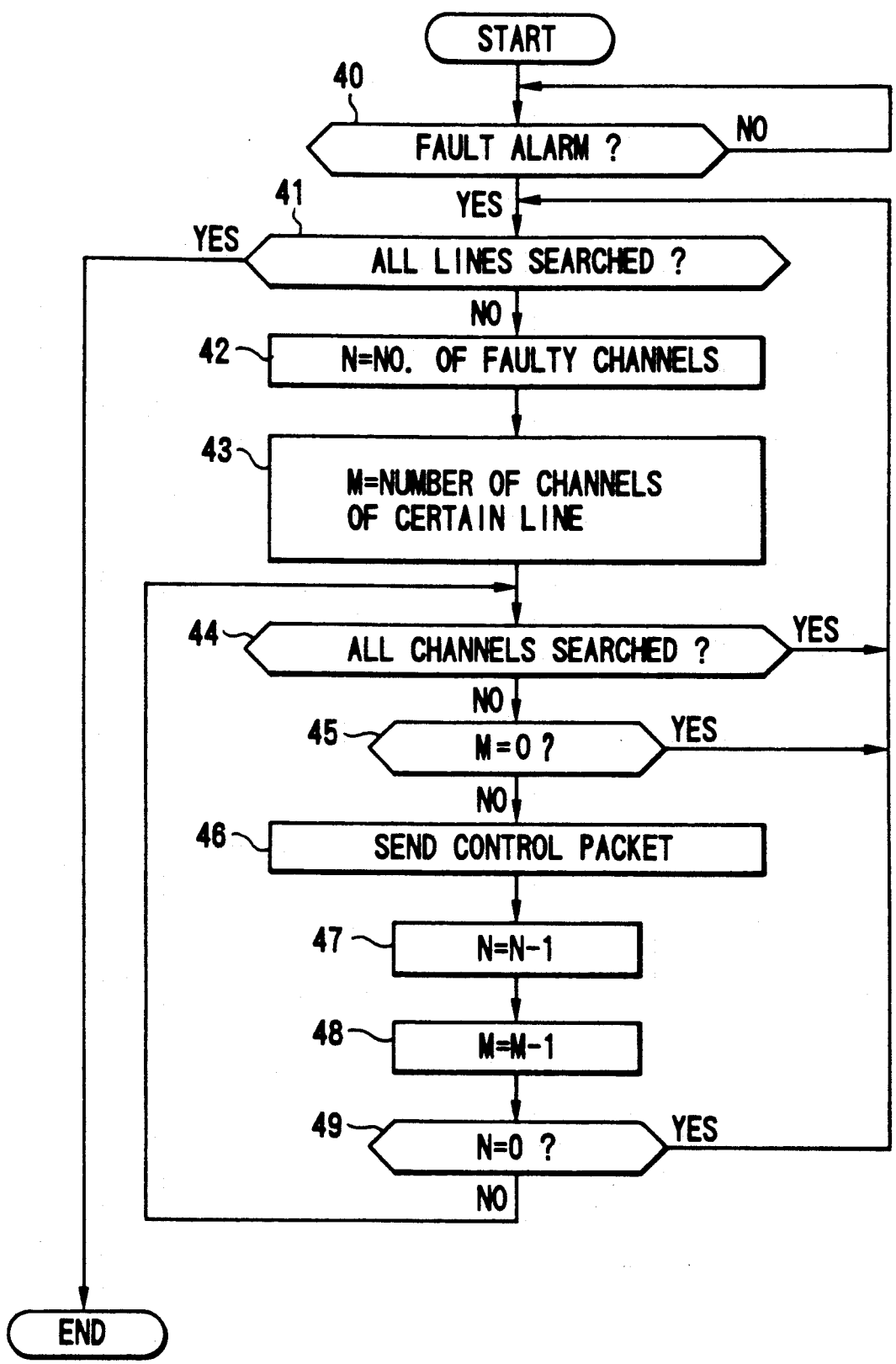
FIG. 6 is a flow chart showing an operation of a CTRL packet transmitting unit.
Figure 7:
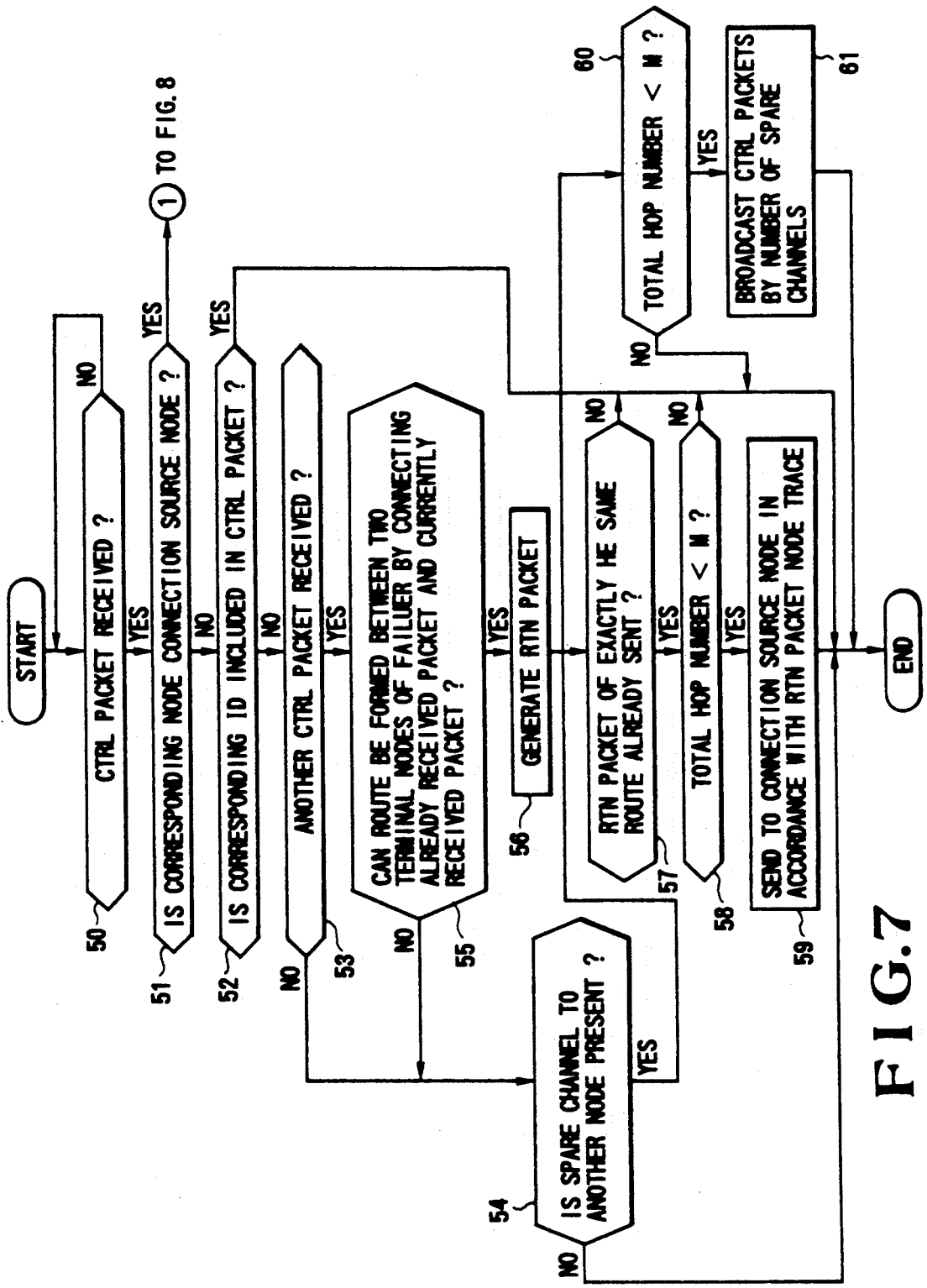
FIG. 7 is a flow chart showing CTRL packet receiving processing.

Details of the processors 30 to 33 will be described by reference to FIGS. 6 to 10a and 10b, with FIGS. 6 and 7 illustrating details of the control-packet processor 30, while FIGS. 8, 9, 10a and 10b showing details of the return-packet processor 31, the acknowledgment (ACK/NAK) processor 32 and the end-packet processor 33, respectively.

FIG. 6 shows a flow of the CTRL packet transmitting unit. When alarm information from the alarm detector 29 is detected, the flow advances from process 40 to process 41. The position of a node at which this process is activated is limited to two terminals of a failed line. If all lines are completely searched, the flow is ended. If not, the number N of channels having failures and the number M of spare channels of a line having channels to be searched are set in processes 42 and 43, respectively. If search of all the channels is not finished, the number of spare channels is checked. If a spare channel is pretransmitted, the flow advances from process 45 to 46 to transmit a CTRL packet. In this routine, the number M of spare channels or the number N of failure channels is decremented by one each time the routine is performed. When one of the numbers reaches 0, search of a corresponding line is finished. This processing is repeated a plurality of times corresponding to the number of lines, and the process shown in FIG. 6 is ended.

FIG. 7 shows a flow of CTRL packet receiving processing. When a CTRL packet is received, process 51 is executed to check whether a corresponding node is a connection source node (in this case, of the two nodes of a failed line, a node having a smaller ID No. is uniquely determined to be a connection source node while the other node is determined to be a connection destination node). If the node is a connection source node, the flow advances to an END packet transmission flow shown in FIG. 8. If not, the flow advances to process 52 to check whether the ID of the node is already included in the CTRL packet. If the ID is not included, the flow advances to process 53. In process 53, whether another CTRL packet is received is checked. If another CTRL packet is received, the flow advances to process 55 to compare the connection source node ID and the connection destination node ID of the above CTRL packet with those of the currently received CTRL packet, thereby checking whether their connection destination node IDs and the connection source node IDs coincide with each other. If a coincidence is found, since a channel connecting the two nodes of the failed line, the flow advances to process 56. In process 56, node trace data is formed from the two CTRL packets, and a total of the numbers of hops is calculated to generate an RTN packet. The flow advances to process 57 to check whether an RTN packet having exactly the same route as the RTN packet generated in process 56 is already transmitted from its own node. If a corresponding RTN packet is already transmitted, the flow shown in FIG. 7 is ended. If the generated RTN packet is unique, the flow advances to process 58. If the number of hops is less than a predetermined value in process 58, the flow advances to process 59 to transmit the RTN packet on a route connected to the connection source node in accordance with its node trace. If any other CTRL packet is not pretransmitted in process 52 or no route can be formed in process 53, the flow advances to process 54 to check whether a spare channel to another node is pretransmitted. If no spare channel is pretransmitted, the flow is ended. If not, after it is determined in step 60 that the number of hops is less than a predetermined value, the CTRL packet is broadcast to the spare channel in process 61. Process 61 is realized by processes 41 to 49 shown in FIG. 6.

Figure 8:
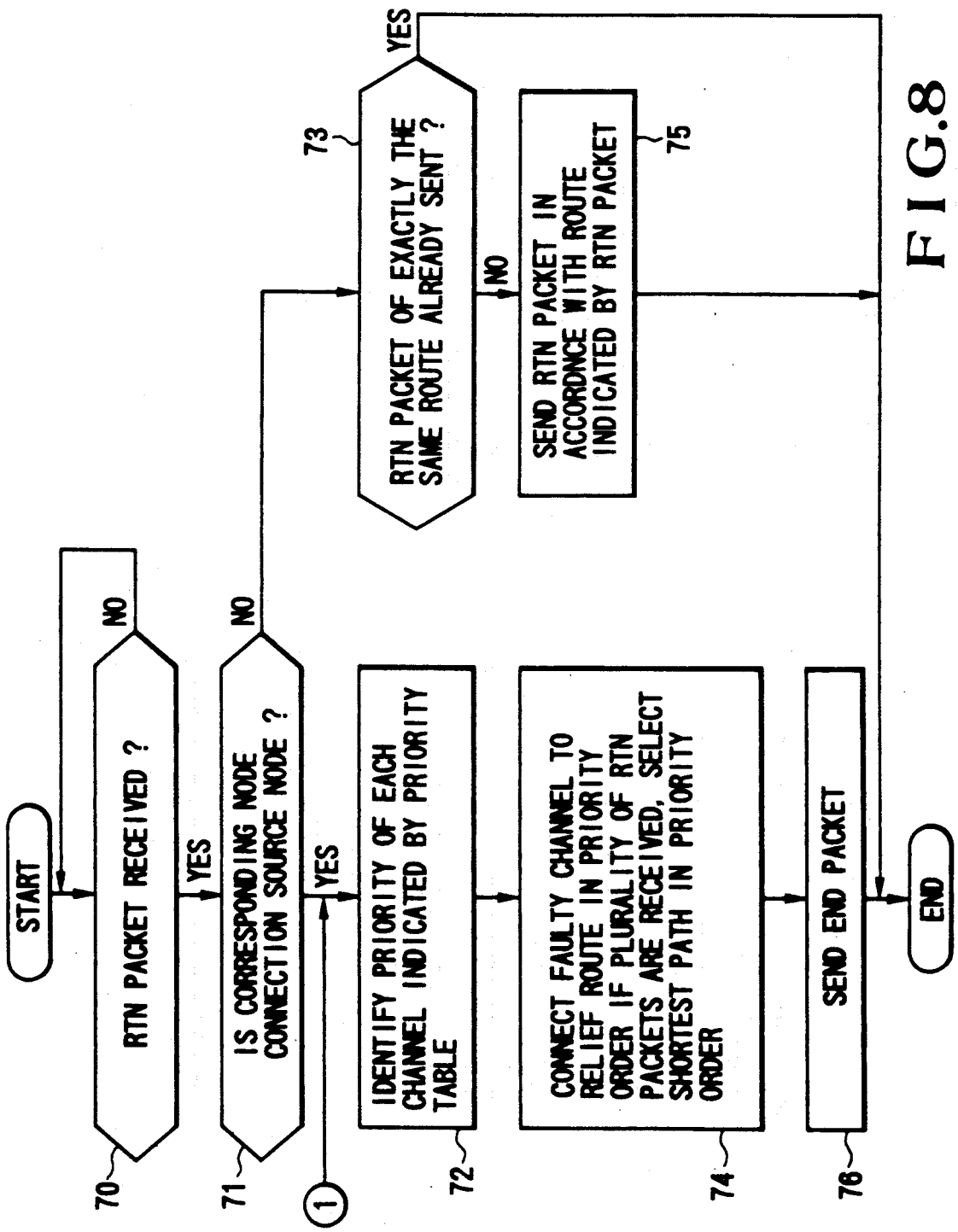
FIG. 8 is a flow chart showing RTN packet receiving processing.

FIG. 8 shows a flow of RTN packet receiving processing. When an RTN packet is received, it is checked by identifying the connection source node ID of the received RTN packet whether a corresponding node is a connection source node with respect to the packet. If the node is a connection source node, the flow advances to process 72 to check the priority order of channels pretransmitted between the connection source and destination nodes in accordance with the priority table 28b shown in FIG. 5. In addition, in step 74, failed channels are connected to a relief route indicated by the RTN packet in the priority order. If a plurality of RTN packets are received at the same time, an RTN packet having the shortest path based on the number of hops is assigned in the priority order. The flow advances to process 76 to transmit an END packet to the route which has received the corresponding RTN packet. If the node of its own is not a connection source node in process 71, it is checked in process 73 whether the RTN packet of the same route is transmitted. If the route of the currently received RTN packet is unique, this RTN packet is transmitted to the route of the connection source node in accordance with the node trace of the packet.

Figure 9:
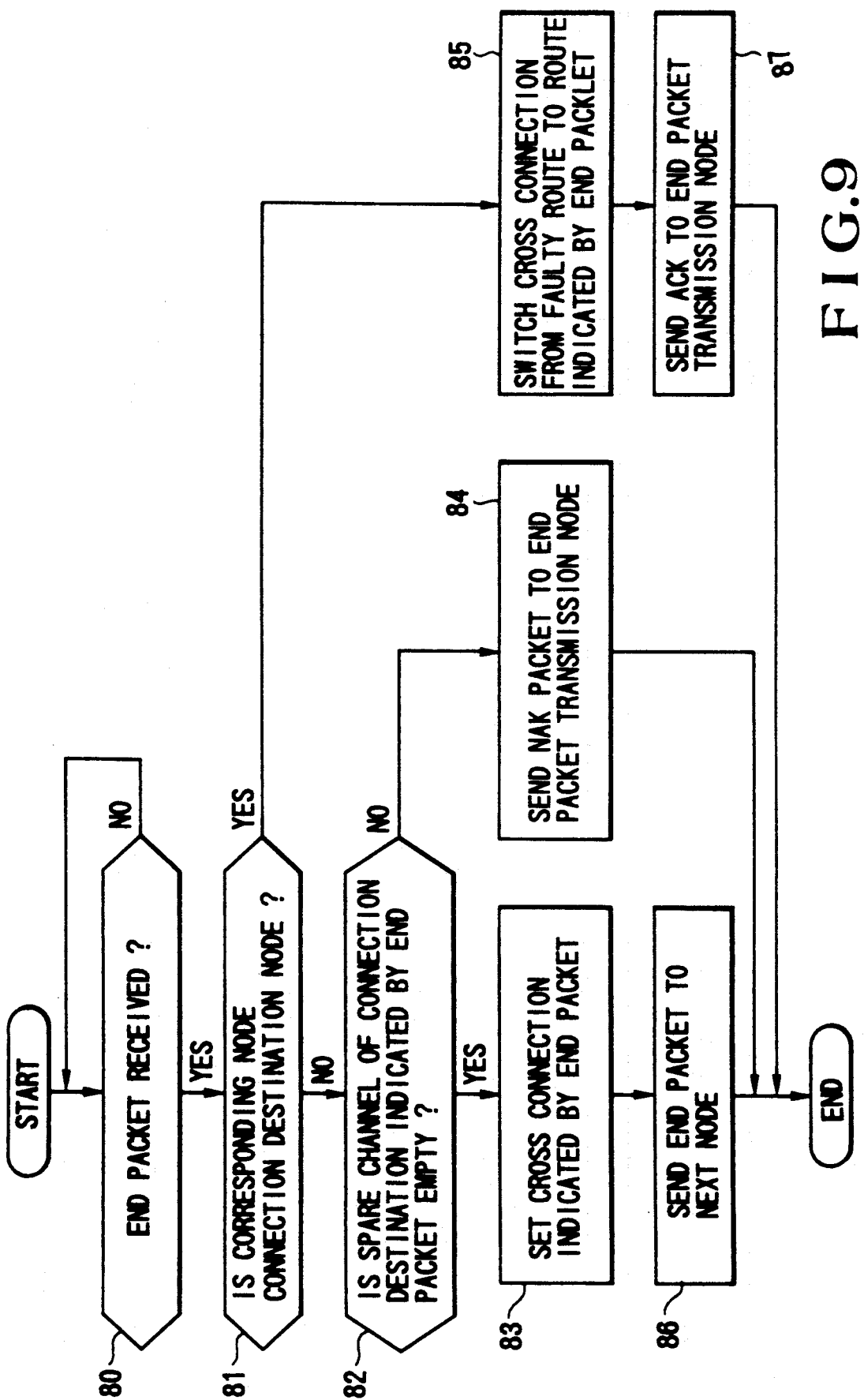
FIG. 9 is a flow chart showing END packet receiving processing.

FIG. 9 shows a flow of END packet receiving processing. When an END packet is received, the flow advances from process 80 to 81. In process 81, it is checked whether a corresponding node is a connection destination node. If the node is not the connection destination node, the flow advances to process 82. In process 82, it is checked whether a spare channel of a transmission destination of the END packet indicated by the node trace of the END packet is empty. If the spare channel is empty, the flow advances to process 83 to set a cross connection so as to connect the route indicated by the trace data of the END packet. Subsequently, the END packet is transmitted to the next node indicated by the node trace in process 86.

If the node is determined to be a connection destination node in process 81, the flow advances to process 85 to set a cross connection from the FAULTY route to the route indicated by the END packet, thereby completing formation of a relief route. In process 87, the ACK is returned. If no empty spare channel is pretransmitted in step 82, an NAK packet is transmitted to the END packet transmission node.

Figure 10A:
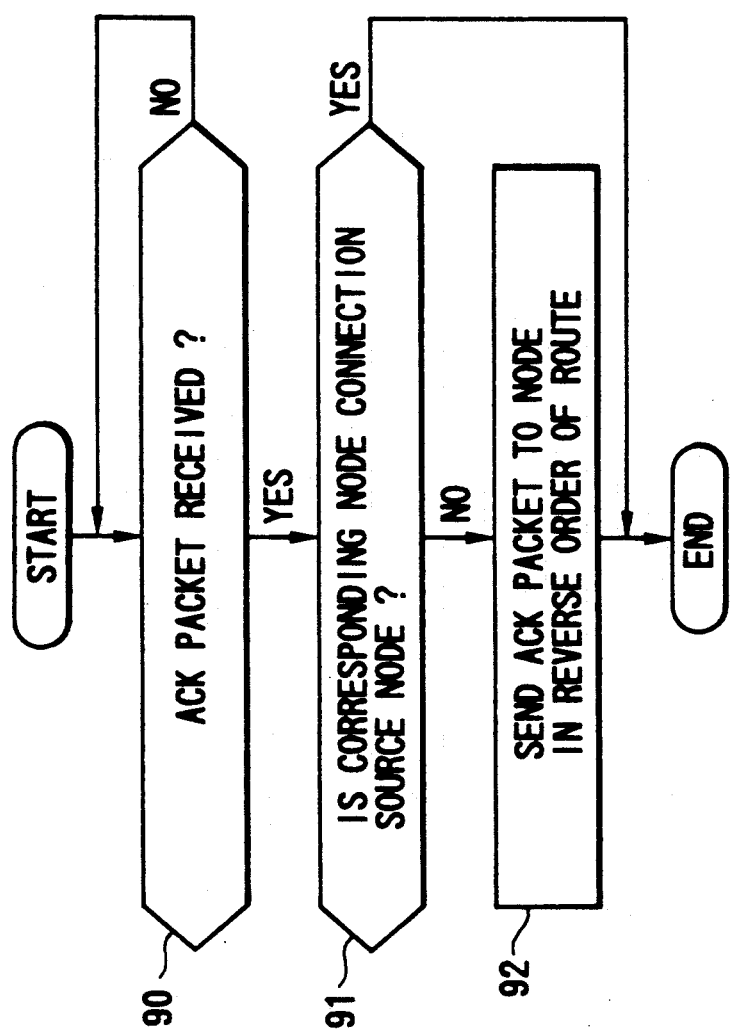
FIG. 10a is a flow chart showing ACK packet receiving processing.

FIG. 10a shows an ACK packet receiving processing flow. When an ACK packet is received, the flow advances to process 91 to check whether a corresponding node is a connection source node with respect to the received ACK packet. If the node is a connection source node, the flow is normally ended. If the node is not a connection source node, the ACK packet is transmitted to a route connected to a connection source node in accordance with a node trace.

FIG. 10b shows an NAK packet receiving processing flow. When an NAK packet is received, the flow advances to process 101. In process 101, it is checked whether a corresponding node is a connection source node with respect to the received NAK packet. If the node is not the connection source node, the NAK packet is transmitted to a route connected to the connection source node in accordance with the node trace. In step 105, if a cross connection already set by the corresponding END packet is pretransmitted, the connection is released. If the node is a connection source node, the flow advances to process 102 to check whether an RTN packet connected to the same connection destination node is pretransmitted. If a corresponding RTN packet is pretransmitted, an END packet corresponding to the RTN packet is transmitted. If no corresponding RTN packet is pretransmitted, the relief node search is finished.

An embodiment shown in FIGS. 11a to 11l will be described below.

Figure 11A:
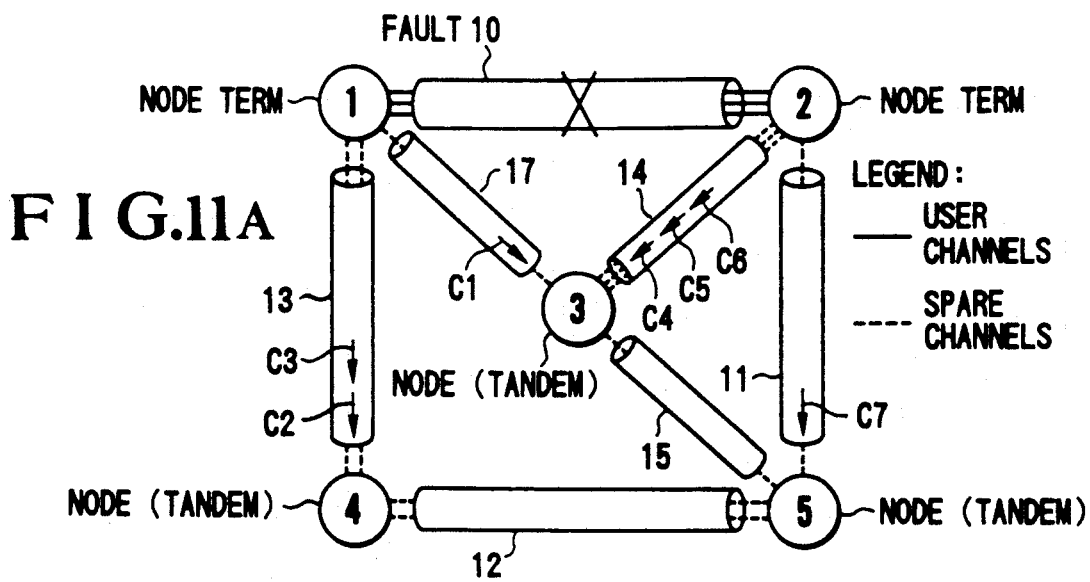

In FIG. 11a, since the line 10 is failed, the node 1 transmits a CTRL packet C1 to the line 17 and CTRL packets C2 and C3 to the line 13.

Similarly, the node 2 transmits C4, C5, and C6 to the line 14 and C7 to the line 11.

Figure 11B:
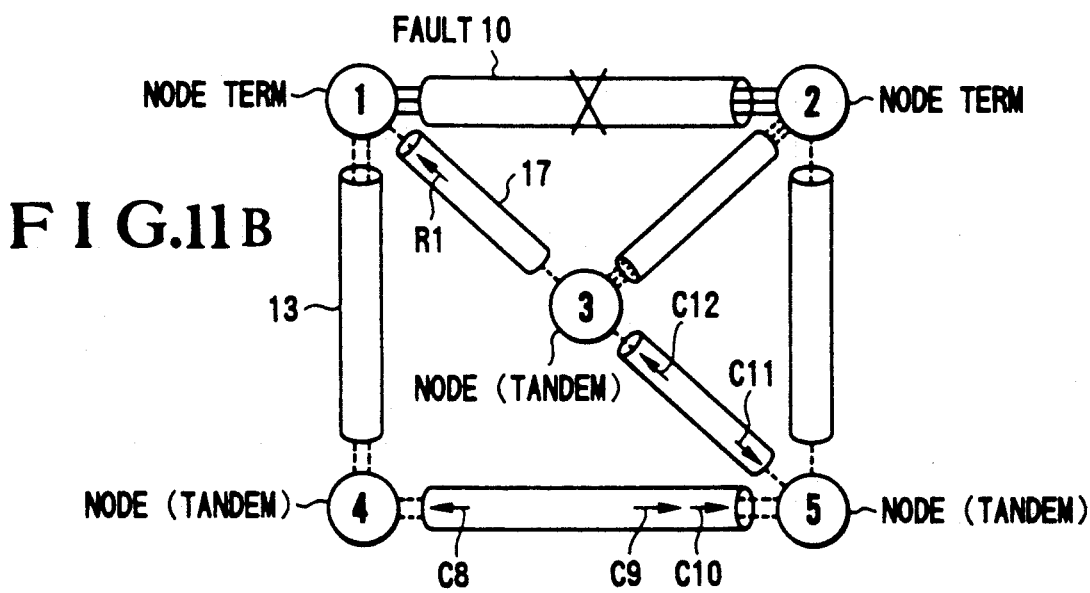

In FIG. 11b, the node 3 receives the CTRL packets C1 from the node 1 and the CTRL packets C4, C5, and C6 from the node 2, determines to connect C1 to C4, and transmits an, RTN packet R1 to the node 1. In addition, the node 3 transmits a CTRL packet C11 added with trace data and the number of hops to the node 5.

The node 4 adds trace data and the number of hops to C2 and C3 and transmits C9 and C10 to the node 5.

The node 5 adds trace data and the number of hops to C7 and transmits C12 to the node 3 and C8 to the node 4.

Figure 11C:
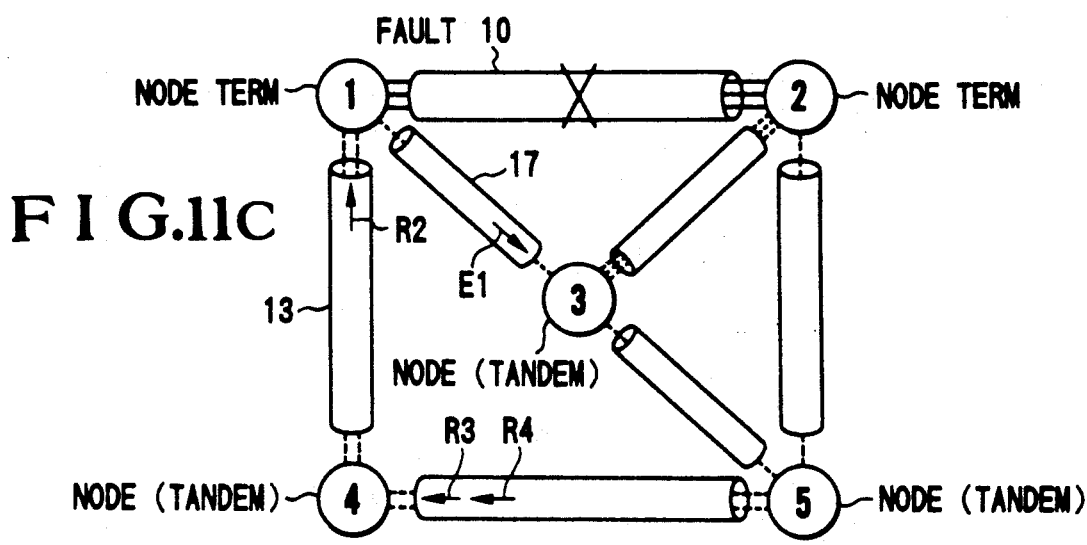

In FIG. 11c, the node 1 receives R1 and transmits an END packet E1 to the node 3 in order to select the route indicated by R1 as an alternate route.

Although the node 3 receives C12, it already has transmitted R1 to the node 1, and a connectable channel is no longer pretransmitted. Therefore, the node 3 abandons C12.

Since the node 4 connects C2 and C8 to constitute a channel, it sends an RTN packet R2 to the node 1.

The node 5 connects C9 with C11 and C10 with C11 and transmits R3 and R4 to the node 4.

Figure 11D:
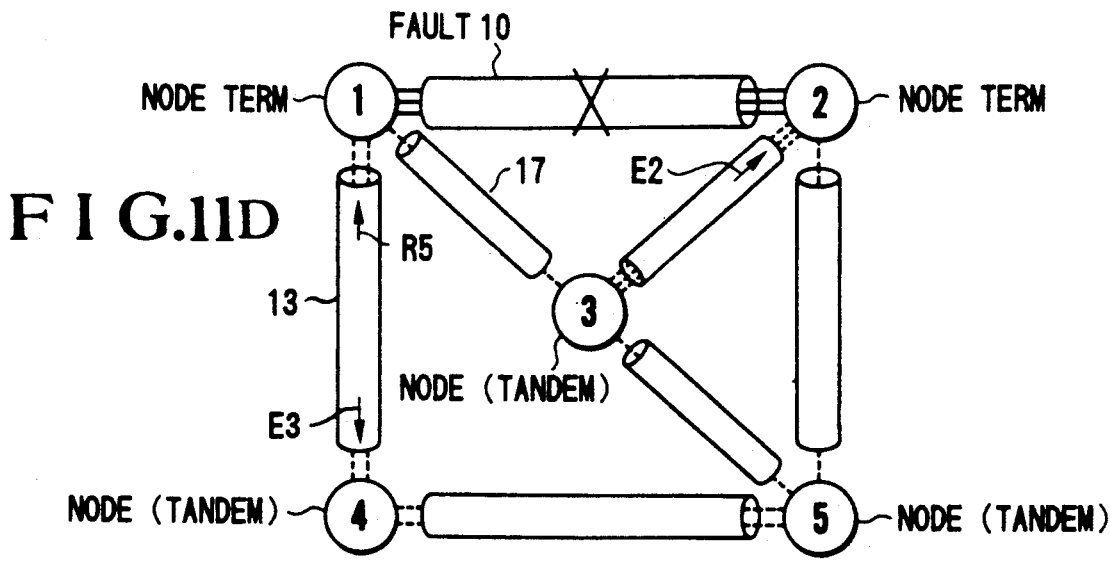

In FIG. 11d, the node 1 selects a channel indicated by R2 as an alternate route and transmits E3 to the node 4.

The node 3 receives E1 from the node 1 to form a cross connection of the node 3 and transmits an END packet E2 to the node 2.

The node 4 receives R3 and R4, abandons R3 because it is already transmitted to the node 1 as R2, and transmits R4 to the node 1 as R5.

Figure 11E:
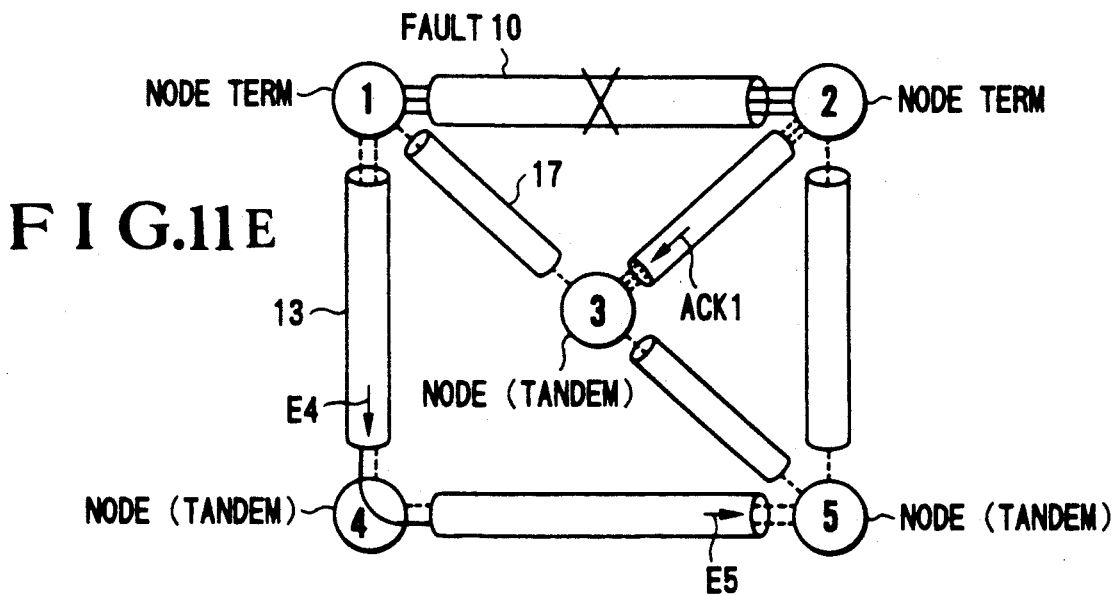

In FIG. 11e, the node 1 selects a channel indicated by R5 as an alternate route and transmits an END packet E4 to the node 4.

The node 2 receives E2 and performs switching from the faulty line to this channel or transmits ACK 1 with respect to E2.

The node 4 forms a cross connection in accordance with the received END packet E3 and transmits E5 to the node 5.

Figure 11F:
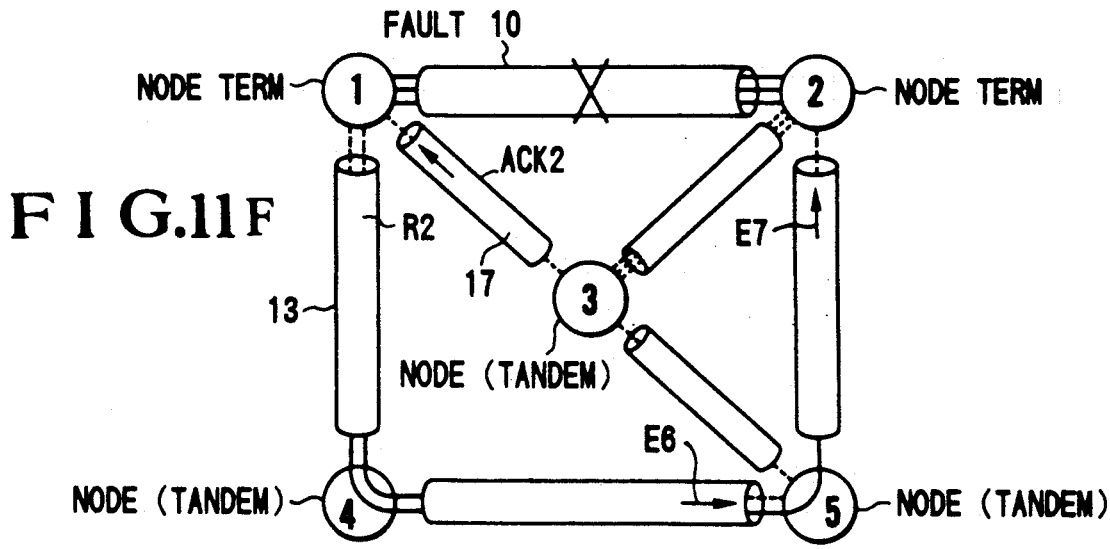
Figure 11J:
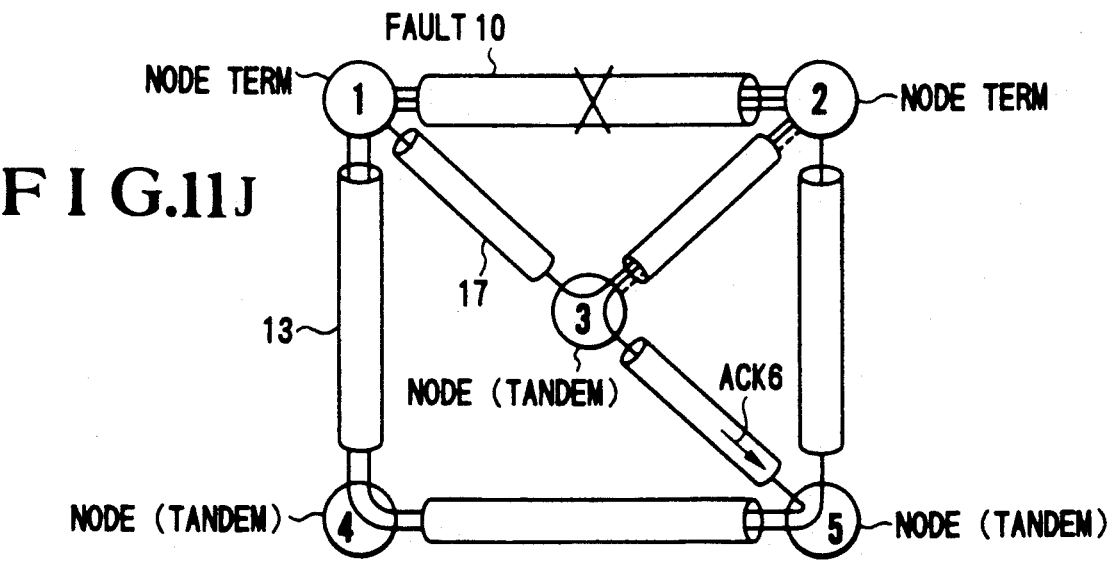
Figure 11K:
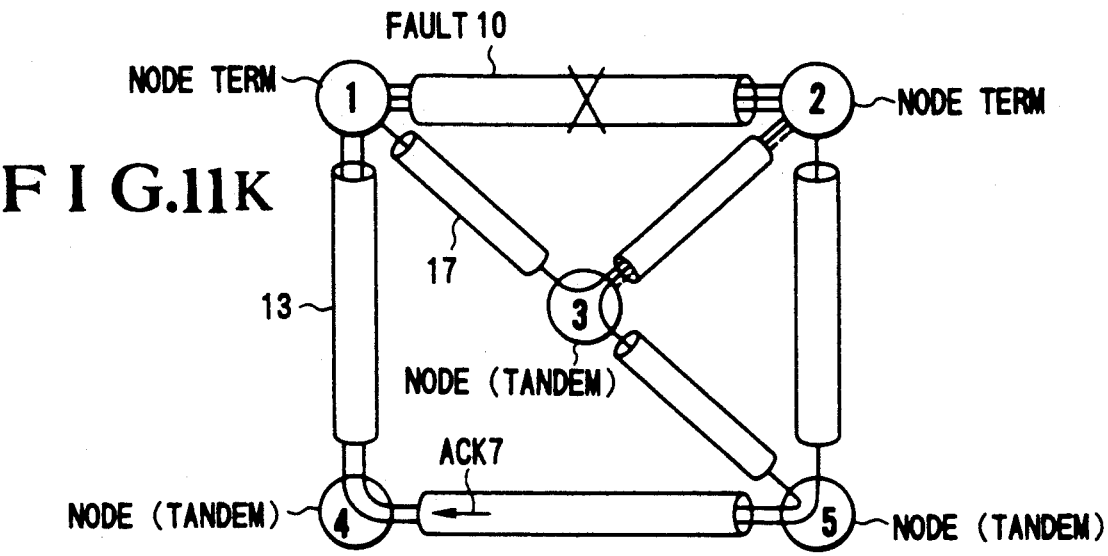
Figure 11L:
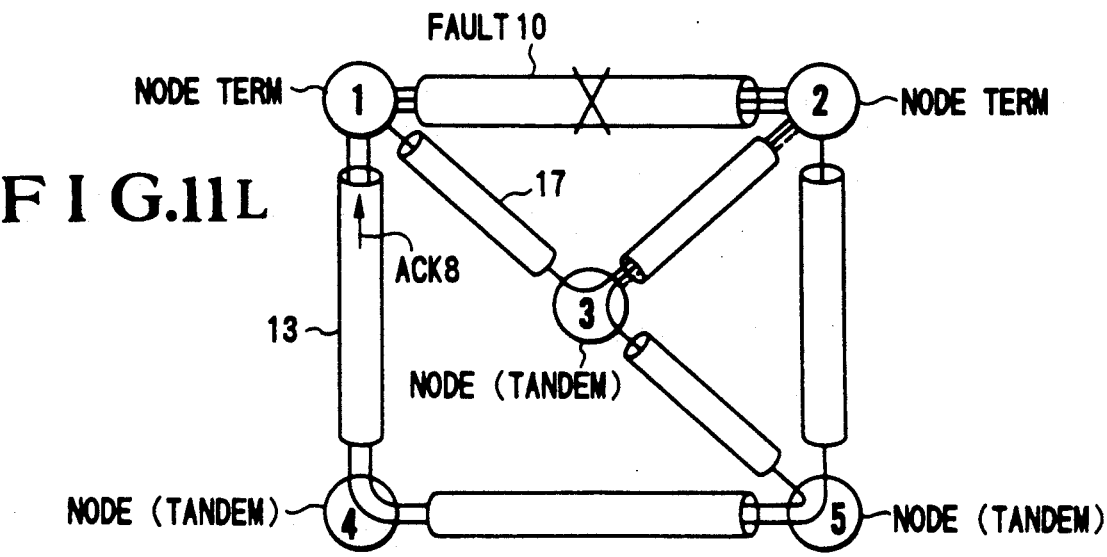

In FIG. 11f, the node 5 receives E5 to form a cross connection and transmits E7 to the node 2.

The node 4 receives E4 to form a cross connection and transmits E6 to the node 5.

Similarly in FIGS 11g to 11l, the nodes 5 and 3 form a cross connection, and E9 finally reaches the node 2 to perform switching from the faulty channel to this channel.

In addition, when E7 reaches the node 2, the node 2 transmits the ACK 3 to the node 5. The ACK 3 reaches the node 1 via the node 4. Similarly, when E9 reaches the node 2, an ACK 5 is transmitted to the node 3. The ACK 5 reaches the node 1 via the nodes 5 and 4.

What is claimed is:

1. A self-distributed transmission line failure restoring system including at least three nodes arbitrarily interconnected by bidirectional transmission lines, each of said nodes comprising:

an alternate route search information transmitting unit for transmitting alternate route search information to all of said connected transmission lines when a given node is determined to be a channel terminal of a failed transmission line in accordance with failure detection information;

an alternate route connection information transmitting unit for generating alternate route connection information having anode trace and transmitting the information to a connection destination node upon receiving the alternate route search information from both channel terminal nodes connected by said failed transmission lines;

a check information transmitting unit for receiving the alternate route connection information to set an alternate route and transmitting check information having a ode trace to a connection source node through the set alternate route when said given node is determined to be a connection destination node; and a check information receiving unit for receiving the check information to determine an alternate route of said failed transmission line when said given node is determined to be the connection source node.

2. A system according to claim 1, wherein said check information transmitting unit receives a plurality of pieces of alternate route connection information to set a shortest path of a plurality of paths as the alternate route.

3. A system according to claim 1, wherein said check information transmitting unit sets a path having a minimum number of hops as the alternate route.

4. A system, according to claim 1, wherein the alternate route search information has node trace information, hop count information, a transmission line ID, a connection source node ID, and a connection destination node ID.

5. A system according to claim 1, wherein said alternate route search information transmitting unit transmits the alternate route search information to all of said connected transmission lines in accordance with the number of failed channels when the number of empty channels of a given transmission path is large or the number of empty channels when the number of empty channels is small.

6. A system according to claim 1, wherein when the alternate route can be formed by combining two pieces of alternate route search information, said alternate route connection information transmitting unit generates alternate route connection information having a synthesized node trace and a total number of hops of the two pieces of alternate route search information.

7. A system according to claim 6, wherein said alternate route connection information transmitting unit transmits the alternate route connection information when an ID No. of said given node is not included in alternate route connection information, alternate route connection information having the same path is not transmitted yet, and the total number of hops is not less than a predetermined value.

8. A system according to claim 1, wherein the alternate route connection information has an alternate route connection information transmission node ID, an intranode alternate route connection information serial No., node trace information, a transmission line ID, a connection source node ID, and a connection destination node ID.

9. A system according to claim 1, wherein said alternate route connection information transmitting unit adds an ID of said given node and the number of hops to a node trace and transmits alternate route search information to connected transmission lines upon receiving only one alternate route search information or when no alternate route can be formed even upon receiving not less than two pieces of information.

10. A system according to claim 8, wherein a newly received alternate route connection information has the same alternate route connection information transmission node ID, intranode serial number, and node trace of the received alternate route connection information, a transmission line ID, and a failed transmission channel connected to an alternate route.

11. A system according to claim 1, wherein when said given node is not a connection source node and an alternate route indicated by a node trace of received alternate route connection information is set for said given node for the first time, said check information transmitting unit transmits the alternate route connection information to a connection source node through the route indicated by the node trace.

12. A system according to claim 1, wherein when said give node is not a connection destination node and an empty spare channel is present in a transmission line indicated by a node trace of check information, said check information receiving unit sets a cross connection so as to connect nodes indicated by the check information and transmits the check information to a path connected to a connection destination node in accordance with the node trace.

* * * * *